(12) United States Patent
Hotto

(10) Patent No.: US 9,297,264 B2
(45) Date of Patent: *Mar. 29, 2016

(54) ROTATABLE BLADE APPARATUS WITH INDIVIDUALLY ADJUSTABLE BLADES

(71) Applicant: ENERGYIELD LLC, Carlsbad, CA (US)

(72) Inventor: Robert Hotto, Carlsbad, CA (US)

(73) Assignee: ENERGYIELD LLC, Carlsbad, CA (US)

(*) Notice: Subject to any disclaimer, the term of this patent is extended or adjusted under 35 U.S.C. 154(b) by 331 days.

This patent is subject to a terminal disclaimer.

(21) Appl. No.: 14/050,532

(22) Filed: Oct. 10, 2013

(65) Prior Publication Data

US 2014/0044547 A1    Feb. 13, 2014

Related U.S. Application Data

(63) Continuation of application No. 11/451,536, filed on Jun. 12, 2006, now Pat. No. 8,608,441.

(51) Int. Cl.
| | | |
|---|---|---|
| *F03D 11/00* | (2006.01) | |
| *F01D 5/30* | (2006.01) | |
| *F03D 1/06* | (2006.01) | |
| *F03D 7/00* | (2006.01) | |
| *F03D 7/02* | (2006.01) | |

(52) U.S. Cl.
CPC ............ *F01D 5/30* (2013.01); *F03D 1/0608* (2013.01); *F03D 7/00* (2013.01); *F03D 7/024* (2013.01); *F03D 7/0224* (2013.01); *F03D 7/0236* (2013.01); *F05B 2240/202* (2013.01); *F05B 2240/2021* (2013.01); *F05B 2240/31* (2013.01); *F05B 2240/312* (2013.01); *F05B 2240/313* (2013.01); *Y02E 10/721* (2013.01); *Y02E 10/723* (2013.01)

(58) Field of Classification Search
CPC ... F03D 1/0675; F03D 7/0224; F03D 7/0236; F03D 7/024; F03D 7/041; F05B 2240/202; F05B 2240/2021; F05B 2240/2023; F05B 2240/31; F05B 2240/312; F05B 2240/3121; F05B 2240/313
See application file for complete search history.

(56) References Cited

U.S. PATENT DOCUMENTS 1,540,583 A * 6/1925 Williams ............... F03D 3/068
                                                              416/113
2,704,128 A * 3/1955 Papadakos ............. B64C 13/30
                                                              244/17.21
(Continued)

FOREIGN PATENT DOCUMENTS

EP        0995904        10/1999
WO      2005005824       1/2005

OTHER PUBLICATIONS

E A Bossanyi, Garrad Hassan & Partners Ltd., "Further Load Reductions with Individual Pitch Control", Wind Energy vol. 8, issue 4, pp. 481-485, published online Jul. 7, 2005.

(Continued)

*Primary Examiner* — Ninh H Nguyen
(74) *Attorney, Agent, or Firm* — John L. Rogitz

(57) ABSTRACT

The lengths and/or chords and/or pitches of wind turbine or propeller blades are individually established, so that a first blade can have a length/chord/pitch that is different at a given time to the length/chord/pitch of a second blade to optimize performance and/or to equalize stresses on the system.

18 Claims, 8 Drawing Sheets

(56) References Cited

U.S. PATENT DOCUMENTS

| | | | |
|---|---|---|---|
| 3,249,160 A | 5/1966 | Willy Messerschmitt | |
| 3,934,533 A * | 1/1976 | Wainwright | B63H 9/0607 114/102.16 |
| 3,996,877 A | 12/1976 | Schneekluth | |
| 4,007,407 A | 2/1977 | Kranert | |
| 4,057,960 A | 11/1977 | Werner | |
| 4,109,477 A | 8/1978 | Vogel | |
| 4,138,901 A | 2/1979 | Fortin et al. | |
| 4,141,309 A | 2/1979 | Halboth | |
| 4,202,762 A | 5/1980 | Fontein et al. | |
| 4,260,329 A | 4/1981 | Bjorknas | |
| 4,285,637 A | 8/1981 | Thompson | |
| 4,293,280 A | 10/1981 | Yim | |
| 4,311,472 A | 1/1982 | Hiersig et al. | |
| 4,365,937 A | 12/1982 | Hiebert et al. | |
| 4,371,350 A | 2/1983 | Kruppa | |
| 4,387,866 A | 6/1983 | Eickmann | |
| 4,427,341 A | 1/1984 | Eichler | |
| 4,463,555 A | 8/1984 | Wilcoxson | |
| 4,490,093 A | 12/1984 | Chertok et al. | |
| 4,503,673 A | 3/1985 | Schachle et al. | |
| 4,504,029 A | 3/1985 | Eickmann | |
| 4,540,341 A | 9/1985 | Wuhren | |
| 4,563,581 A | 1/1986 | Perten | |
| 4,563,940 A | 1/1986 | Wuhrer | |
| 4,565,531 A | 1/1986 | Kimon | |
| 4,611,774 A | 9/1986 | Brand | |
| 4,618,313 A | 10/1986 | Mosiewicz | |
| 4,626,170 A | 12/1986 | Dorsch | |
| 4,627,791 A | 12/1986 | Marshall | |
| 4,632,637 A | 12/1986 | Traudt | |
| 4,648,788 A | 3/1987 | Jochum | |
| 4,648,847 A | 3/1987 | Mueller | |
| 4,687,162 A | 8/1987 | Johnson et al. | |
| 4,743,335 A | 5/1988 | Krappitz et al. | |
| 4,770,371 A | 9/1988 | Eickmann | |
| 4,784,351 A | 11/1988 | Eickmann | |
| 4,792,279 A | 12/1988 | Bergeron | |
| 4,801,243 A | 1/1989 | Norton | |
| 4,856,732 A | 8/1989 | Eickmann | |
| 4,880,402 A | 11/1989 | Muller | |
| 4,891,025 A | 1/1990 | Brandt | |
| 4,893,989 A | 1/1990 | Carvalho | |
| 4,899,641 A * | 2/1990 | Khan | B64C 27/54 416/114 |
| 4,900,226 A | 2/1990 | De Vries | |
| 4,919,630 A | 4/1990 | Erdberg | |
| 4,925,131 A | 5/1990 | Eickmann | |
| 4,929,201 A | 5/1990 | Pitt | |
| 4,964,822 A | 10/1990 | Mueller | |
| 4,973,225 A | 11/1990 | Kruppa | |
| 4,982,914 A | 1/1991 | Eickmann | |
| 4,988,303 A | 1/1991 | Thomas | |
| 4,993,919 A | 2/1991 | Schneider | |
| 5,017,089 A | 5/1991 | Schneider et al. | |
| 5,028,210 A * | 7/1991 | Peterson | B63H 1/10 416/164 |
| 5,286,166 A | 2/1994 | Steward | |
| 5,449,129 A | 9/1995 | Carlile et al. | |
| 5,466,177 A | 11/1995 | Alhara et al. | |
| 5,479,869 A | 1/1996 | Coudon et al. | |
| 5,531,407 A | 7/1996 | Austin et al. | |
| 5,554,003 A | 9/1996 | Hall | |
| 5,557,362 A | 9/1996 | Ueda | |
| 5,562,413 A | 10/1996 | Alhara et al. | |
| 5,733,156 A | 3/1998 | Alhara et al. | |
| 5,791,954 A | 8/1998 | Johnson, Jr. | |
| 5,836,743 A | 11/1998 | Carvalho et al. | |
| 5,841,652 A | 11/1998 | Sanchez | |
| 5,859,517 A | 1/1999 | DePasqua | |
| 5,927,656 A | 7/1999 | Hinkleman | |
| 5,997,253 A | 12/1999 | Feehan | |
| 5,997,991 A | 12/1999 | Kato et al. | |
| 6,015,117 A | 1/2000 | Broadbent | |
| 6,019,649 A | 2/2000 | Freisen et al. | |
| 6,032,899 A | 3/2000 | Mondet et al. | |
| 6,045,096 A | 4/2000 | Rinn et al. | |
| 6,123,297 A | 9/2000 | Berry | |
| 6,196,801 B1 | 3/2001 | Muhlbauer | |
| 6,231,005 B1 | 5/2001 | Costes | |
| 6,260,793 B1 | 7/2001 | Balayn et al. | |
| 6,312,223 B1 | 11/2001 | Samuelsson | |
| 6,358,007 B1 | 3/2002 | Castle | |
| 6,374,519 B1 | 4/2002 | Beaumont | |
| 6,379,115 B1 * | 4/2002 | Hirai | F03D 3/068 416/111 |
| 6,413,133 B1 | 7/2002 | McCarthy | |
| 6,431,499 B1 | 8/2002 | La Roche | |
| 6,441,507 B1 * | 8/2002 | Deering | F03D 7/0208 290/44 |
| 6,443,286 B1 | 9/2002 | Bratel et al. | |
| 6,443,701 B1 | 9/2002 | Muhlbauer | |
| 6,454,619 B1 | 9/2002 | Funami | |
| 6,637,202 B2 | 10/2003 | Koch | |
| 6,665,631 B2 | 12/2003 | Steinbrecher | |
| 6,666,312 B2 | 12/2003 | Matranga et al. | |
| 6,666,649 B2 | 12/2003 | Arnold | |
| 6,682,378 B1 | 1/2004 | Day | |
| 6,688,924 B2 | 2/2004 | Marsland et al. | |
| 6,752,595 B2 | 6/2004 | Murakami | |
| 6,855,016 B1 | 2/2005 | Jansen | |
| 6,875,337 B1 | 4/2005 | Schroder et al. | |
| 6,902,370 B2 | 6/2005 | Dawson et al. | |
| 6,902,451 B1 | 6/2005 | Theisen | |
| 6,938,418 B2 | 9/2005 | Koch et al. | |
| 6,940,185 B2 * | 9/2005 | Andersen | F03D 1/0608 290/44 |
| 6,957,991 B2 | 10/2005 | Gibbs | |
| 6,972,498 B2 | 12/2005 | Jamieson et al. | |
| 7,021,978 B2 | 4/2006 | Jansen | |
| 7,030,341 B2 | 4/2006 | Maurer | |
| 7,256,509 B2 | 8/2007 | Brandt et al. | |
| 7,393,180 B2 * | 7/2008 | Von Mutius | F03D 7/0224 416/132 B |
| 7,452,185 B2 | 11/2008 | Ide et al. | |
| 7,513,742 B2 | 4/2009 | Rogall et al. | |
| 7,530,785 B1 | 5/2009 | Deering et al. | |
| 7,891,946 B2 | 2/2011 | Mollhagen | |
| 7,942,634 B2 | 5/2011 | Christensen | |
| 8,608,441 B2 * | 12/2013 | Hotto | F03D 1/0608 416/42 |
| 2002/0150473 A1 | 10/2002 | Castle | |
| 2003/0153215 A1 | 8/2003 | Gibbs | |
| 2003/0230898 A1 | 12/2003 | Jamieson et al. | |
| 2004/0185725 A1 | 9/2004 | Wilkie | |
| 2004/0201220 A1 | 10/2004 | Anderson et al. | |
| 2005/0204930 A1 | 9/2005 | Maurer | |
| 2005/0214126 A1 | 9/2005 | Lobrovich | |
| 2005/0287885 A1 | 12/2005 | Mizuguchi et al. | |
| 2006/0079140 A1 | 4/2006 | Muller | |
| 2011/0229300 A1 | 9/2011 | Kanev et al. | |

OTHER PUBLICATIONS

Alan D. Wright, "National Renewable Energy Laboratory, Technical Report: Modern Control Design for Flexible Wind Turbines" NREL/TP-500-35816, Jul. 2004.

David Lawrence Lemieux, "Rotor Blade Fatigue Reduction on Wind Turbines Using Pitch Control, a Thesis submitted to the Department of General Engineering Montana Tech of the University of Montana for the degree of Master of Science in General Engineering", May 2001.

P. Caselitz, W. Kleingauf, T. Kruger, J. Petschenka, M. Reichardt, K Storzel, "Reduction of Fatigue Loads on Wind Energy Converts by Advanced Control Methods", European Wind Energy Conference, Oct. 1997.

J.L. Tangler, D.M. Somers, "NREL Airfoil Families for HAWTs", updated AWEA, Jan. 1995.

(56) References Cited

OTHER PUBLICATIONS

Torbjorn Thiringer, Andreas Petersson, "Control of a Variable-Speed Pitch-Regulated Wind Turbine", Division of Electric Power Engineering Department of Energy and Environment Chalmers University of Technology, 2005.

E.A. Bossanyi, "Individual Blade Pitch Control for Load Reduction", Wind Energy, 6:119-128; 2003 (published online Oct. 8, 2002).

Morten H. Hansen, Anca Hansen, Torben J. Larsen, "Riso-Report: Control Design for a Pitch-Regulated, Variable Speed Wind Turbine", Riso National Labortory, Denmark, Jan. 2005.

Ryan T. Cowgill, Jake Fouts, Byron Haley, Chris Whitham, "Wind Turbine Roto Design Final Design Report", Boise State University College of Engineering, 2006.

Torben Juul Larsen, Helge A. Madsen, Kenneth Thomsen, "Active Load Reduction Using Individual Pitch, Based on Local Blade Flow Measurements", Wind Energy, 8:67-80, 2005 (Accepted Sep. 13, 2004).

Voith Schneider® Propeller Designer Manual, Jul. 2005 3500 MSW/WA Printed in Germany, pp. 1-12.

* cited by examiner

BLADE WITH SENSOR ARRAY

BLADE ILLUSTRATING ROTATIONAL, LENGTH AND CHORD ADJUSTMENT POINTS

ROTATABLE BLADE APPARATUS WITH INDIVIDUALLY ADJUSTABLE BLADES

FIELD OF THE INVENTION

The present invention relates generally to rotatable blades for wind turbines, and more particularly to blade assemblies for wind turbines and propellers in which the parameters of chord, length, and pitch can be individually adjusted for each blade.

BACKGROUND OF THE INVENTION

Variable pitch propellers have been provided in which the pitch of all blades can be simultaneously changed as appropriate to, e.g., reduce cavitation depending on the speed of rotation of the blades. An example of such a system is disclosed in U.S. Pat. No. 5,733,156, incorporated herein by reference.

In the wind turbine art, U.S. Pat. No. 6,972,498, incorporated herein by reference, provides a wind turbine blade assembly in which the lengths of the blades may be simultaneously changed to account for changing wind speed, imbalances, and control system loads. As understood herein, it would be desirable, for each blade individually, to establish the length and/or chord and/or pitch of the blade.

SUMMARY OF THE INVENTION

A wind turbine blade assembly or a propeller blade assembly has at least first and second blades coupled to a rotor defining an axis of rotation. The tip of the first blade is positioned a first distance from the axis of rotation at a first time, while the tip of the second blade is positioned a second distance from the axis of rotation at the first time, with the first and second distances not being equal.

In some implementations, at least one blade has respective plural parts telescoping relative to each other along the length of the blade. Each blade defines a respective length, and the lengths are different from each other at least at the first time. An actuator can telescope one part of a blade relative to another part of the blade. In some aspects plural actuators can be provided to telescope plural parts. The actuator may be supported on the blade and may receive power through a slip ring. Or, the blades can move longitudinally as they ride against a cam surface. The lengths of the blades may be established based on respective pressure signals representative of fluid pressure on the blades, and/or based on respective angular positions of the blades.

In another aspect, a wind turbine blade assembly or a propeller blade assembly has at least first and second blades coupled to a rotor defining an axis of rotation. The first blade defines a first chord at a first time, the second blade defines a second chord at the first time, and the first and second chords are not equal.

In still another aspect, a wind turbine blade assembly or a propeller blade assembly has at least first and second blades coupled to a rotor defining an axis of rotation. The first blade defines a first pitch at a first time, the second blade defines a second pitch at the first time, and the first and second pitches are not equal.

In another aspect, a method for operating a wind turbine includes establishing a first value for a first parameter of a first blade at a first time, and establishing a second value for the first parameter of a second blade at the first time. According to this aspect, when the blades are disposed in wind, they rotate to cause the wind turbine to produce electrical power.

In another aspect, a wind turbine has an upright support, a rotor coupled to the support, and at least first and second blades coupled to the rotor to cause it to rotate when wind passes the blades. Each blade has first and second configurations. The first configuration of the first blade is identical to the first configuration of the second blade and the second configuration of the first blade is identical to the second configuration of the second blade. As set forth further below, the first blade assumes the first configuration at a first time and the second blade assumes the second configuration at the first time.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
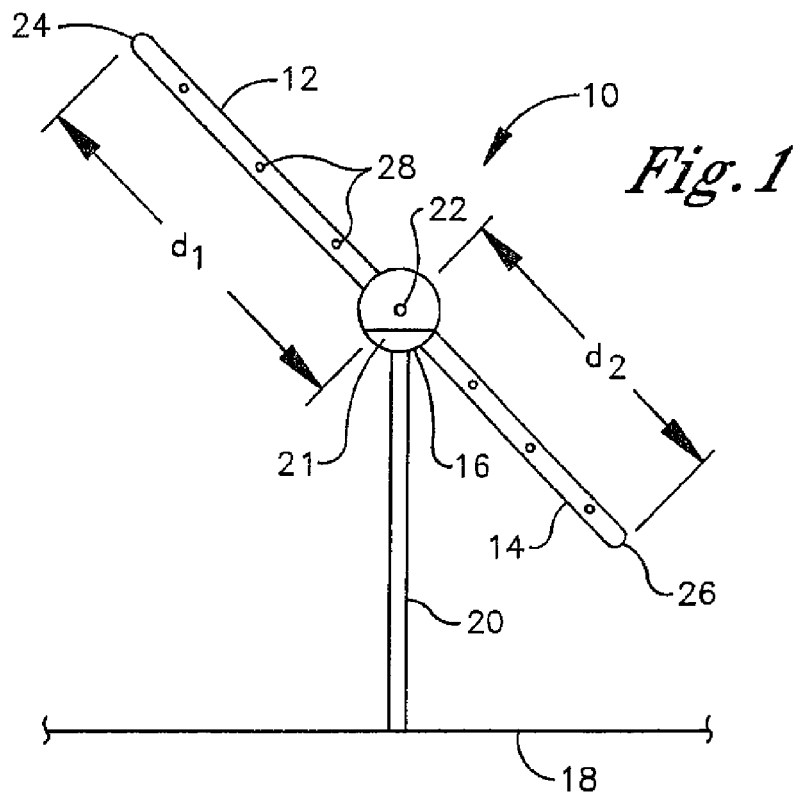
FIG. 1 is a schematic view of a wind turbine in accordance with present principles.

Referring initially to FIG. 1, a wind turbine blade assembly is shown, generally designated 10, which includes first and second blades 12, 14 that are coupled to a rotor 16, it being understood that present principles apply to two, three, or more blades. The rotor 16 is rotatably supported above the surface 18 of the earth by an upright support 20, which holds the blades 12, 14 in a vertical plane above the earth's surface as shown. In accordance with principles known in the art, wind flowing past the blades causes them to turn to thereby cause an associated generator, shown schematically at 21, to generate electric power.

The rotor 16 defines an axis 22 of rotation, and in accordance with disclosure below at least the first blade 12 and preferably both blades 12, 14 can be moved between a long configuration and a short configuration, as well as to intermediate configurations therebetween, and the blade 12 is not constrained to be in the same configuration as the second blade 14. Thus, to illustrate, FIG. 1 shows that the blade 12 has a blade tip 24 that can be configured to be a relatively long distance $d_1$ from the axis 22 of rotation. Simultaneously, the tip 26 of the second blade 14 can be configured to be a second distance $d_2$ from the axis 22 of rotation, with the distances $d_1$, $d_2$ being unequal when present principles are applied. For purposes that will shortly become clear, one or more pressure sensors 28 can be disposed on one or both blades 12, 14. Alternatively, wind speed sensors on the blades 12, 14 or elsewhere can be used.

As set forth further below, the principles outlined herein in terms of variable length also apply to variable pitches and chords, so that in addition to or in lieu of different lengths, the pitches and/or chords of the respective blades 12, 14 may be different from each other at the same point in time. It is to be further understood that the assembly 10 may also, at other times, embody conventional operating principles wherein the blades 12, 14 are identically configured in length, chord, and pitch.

Figure 2:
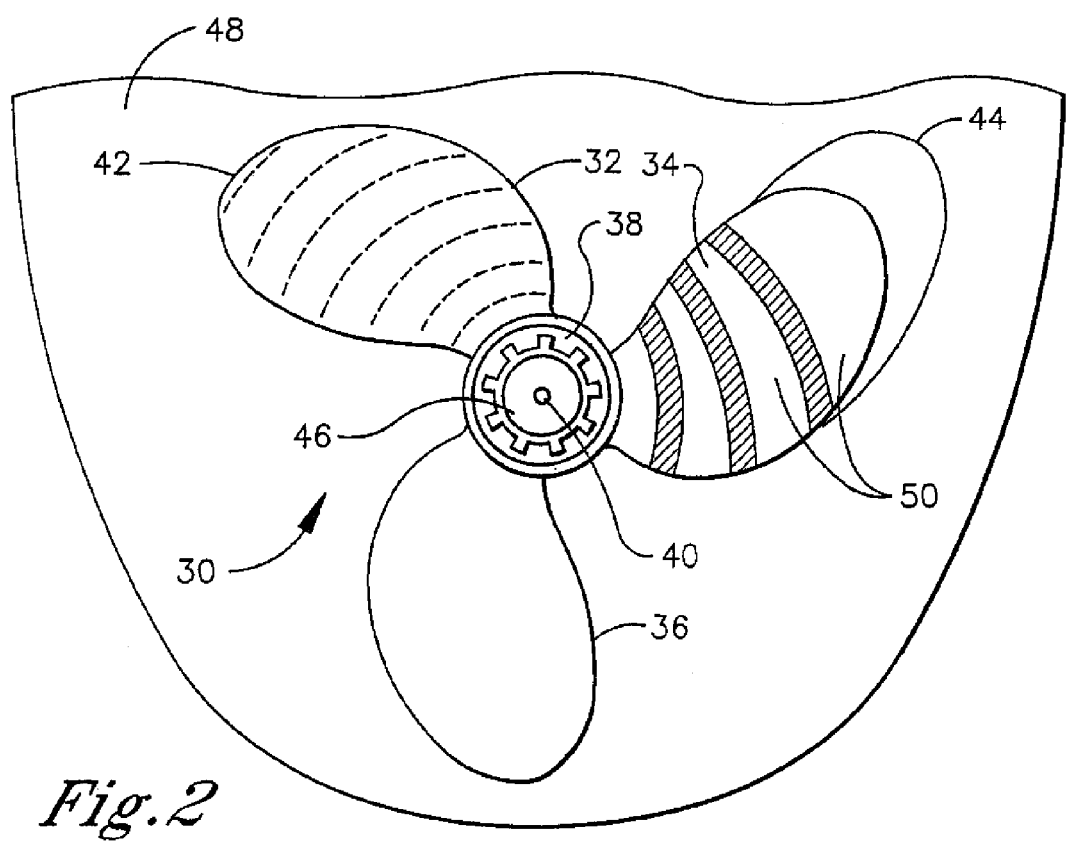
FIG. 2 is a schematic view of a vessel propeller in accordance with present principles.

FIG. 2 shows that the present principles can also be applied to a propeller blade assembly 30 that has at least first and second blades 32, 34, and potentially additional blades 36, coupled to a rotatable rotor 38 that defines an axis 40 of rotation. The tip 42 of the first blade 32 can be configured to be a first distance from the axis 40 of rotation and simultaneously the tip 44 of the second blade 34 can be configured to be a further distance from the axis 40 of rotation than is the tip 42 of the first blade 32. A shaft 46 of a waterborne vessel 48 can hold the blades 32, 34, 36 in a vertical plane (at neutral vessel pitch) as shown.

As set forth further below, the principles outlined herein in terms of variable length also apply to variable pitches and chords, so that in addition to or in lieu of different lengths, the pitches and/or chords of the respective blades 32, 34, 36 may be different from each other at the same point in time. It is to be further understood that the assembly 30 may also, at other times, embody conventional operating principles wherein the blades are identically configured in length, chord, and pitch.

For illustration purposes the disclosure below focuses on a wind turbine application, it being understood that the principles embodied therein may be applied to the propeller assembly 30, in which, e.g., the blade 34 has plural portions 50 that can telescope or otherwise move in the axial dimension of the blade 34 relative to each other (and, as stated above, potentially can also move relative to each other in the chord dimension).

Figure 3:
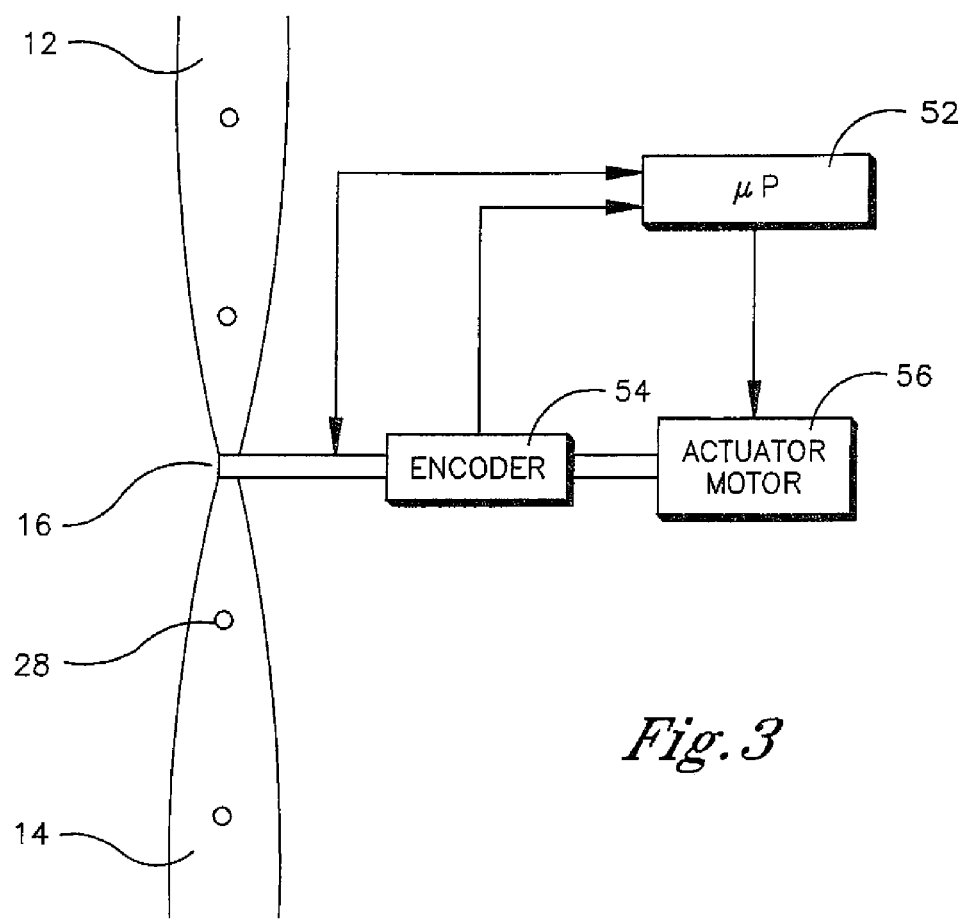
FIG. 3 is a block diagram showing control elements in accordance with one embodiment.
Figure 4:
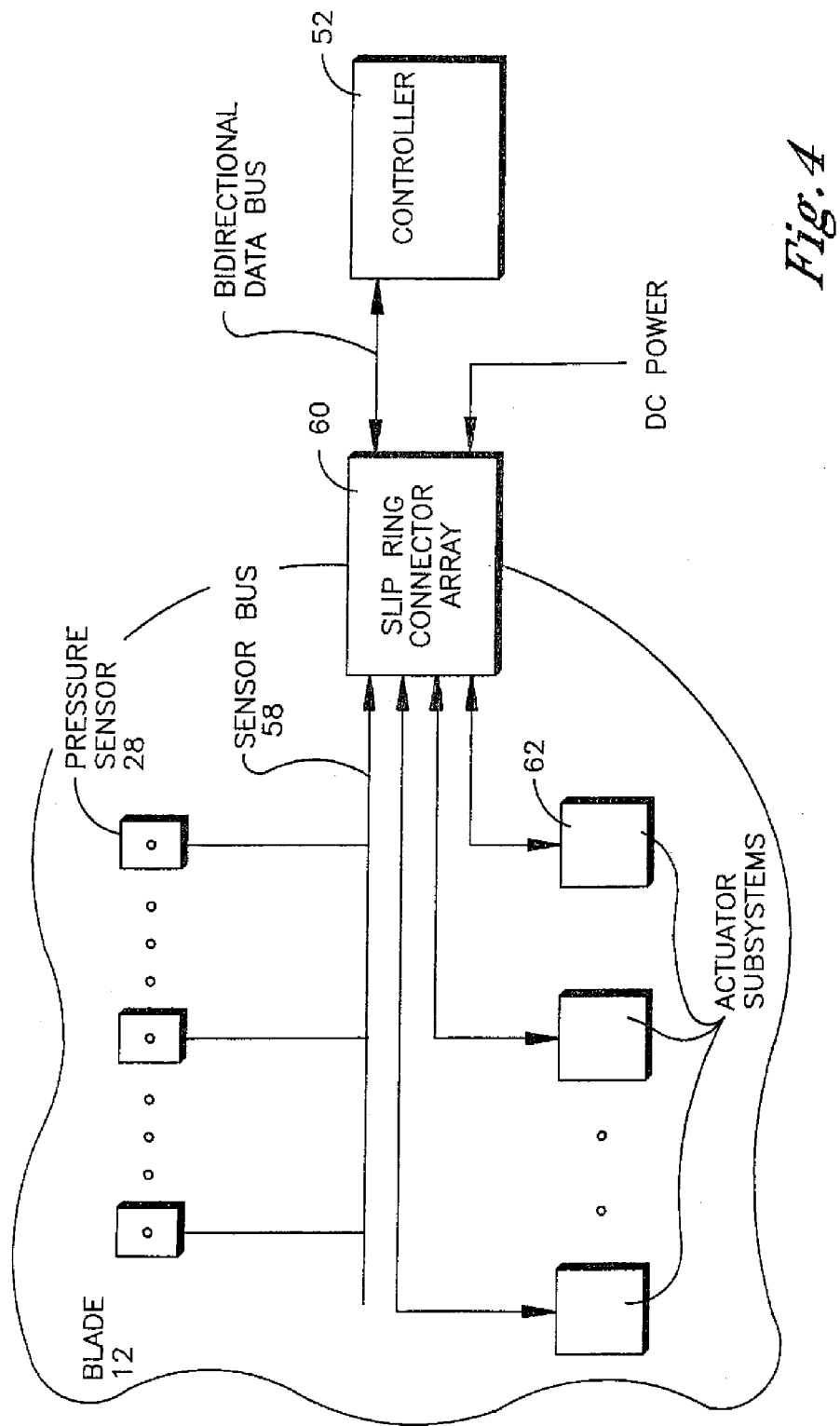
FIG. 4 is a block diagram showing control elements in accordance with another embodiment.

FIGS. 3 and 4 show various system configurations for controlling the lengths (and/or chords and/or pitches) of the blade 12, and preferably also of the blade 14. A controller or processor 52 can receive input from the pressure sensors 28 on the blades and/or from an encoder 54 that outputs a signal representing the angular position of the rotor 16. The controller or processor 52 controls an actuator with motor 56 to establish the length (and/or chord and/or pitch) of the blades. The motor may be a stepper motor or other appropriate motor, and as set forth further below may be located within the blade 12 or outside the blade 12. From time to time herein, "actuator" may be used to refer to both a motor and the linkages that couple the motor to the movable blade portions, and to just the linkages themselves.

In some implementations, the length of each blade 12, 14 is established based on its angular position. Thus, in non-limiting embodiments a blade can assume the long configuration when at the top dead center position (pointing straight up vertically from the rotor) and the short configuration in the opposite position, and can have intermediate lengths when moving therebetween. In terms of the two blade application of FIG. 1, the first blade 12 is in the long configuration at the same time the second blade 14 is in the short configuration.

In addition to or in lieu of using angular position to establish the lengths of the blades, the lengths of the blades can depend on respective pressure signals from the sensors 28, which are representative of fluid pressure on the blades. In this embodiment, the controller or processor 52 establishes blade length both to optimize performance while minimizing load imbalances on the rotor by, e.g., establishing blade lengths that result in equal pressures on both blades 12, 14 while providing optimum length based on wind speed, to ensure that the blades rotate as fast as feasible while remaining below angular velocity limits.

FIG. 4 shows further details of the controls of one illustrative non-limiting embodiment. As shown, the pressure sensors 28 on the blade 12 are electrically connected to a sensor bus 58 within the blade. The bus 58 is connected to the controller or processor 52 through a slip ring connector array 60, which, in accordance with slip ring principles known in the art, permits relative rotational movement between the blade 12 and the controller 52 while maintaining electrical connectivity between them. A bidirectional data bus 59 can be provided between the slip ring connector array 60 and the controller 52 to permit the controller 52 to receive pressure signals and to output control signals to the actuators discussed below.

More particularly, electrical power, as well as control signals from the controller 52, is also provided through the slip ring to one or more actuator subsystems 62, each of which can include a respective motor and a respective linkage that connects the actuator to a respective blade portion to move the blade portion. Alternatively, a single motor may be provided within the blade 12 and linked through gears or other linkages as set forth further below to move each of plural individual actuator subsystems that, in such a circumstance, would include only linkages to respective blade portions.

Figure 5:
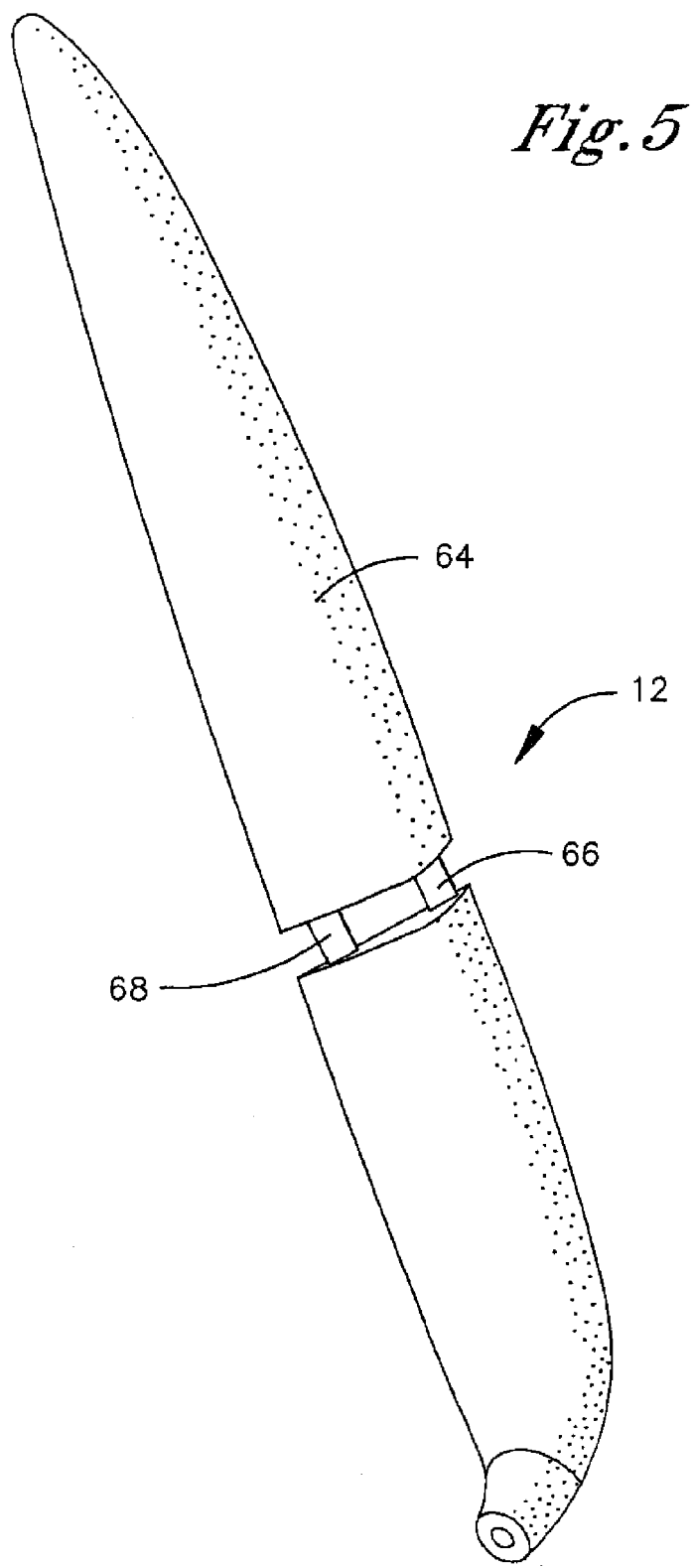
FIG. 5 is a perspective view of a blade in the extended configuration.

FIGS. 5-8 show further details of non-limiting implementations of the present blade. As shown in FIG. 5 and using the first blade 12 as an example, the blade can have plural portions 64 that move relative to each other in the length dimension of the blade, it being understood that similar principles apply to expand and contract the blade in the chord dimension. As shown at 66, an actuator linkage can be coupled to two adjacent substantially rigid hollow blade portions 64 to move the blade portions relative to each other. In the embodiment shown in FIG. 5, the blade portions abut each other along their transverse edges in the short configuration, with facing transverse edges of adjacent blade portions being distanced from each other in the long configuration and, if desired, a flexible membrane 68 (portions of which are removed in FIG. 5 to show the linkage 66) can enclose the space between the portions.

Figure 6:
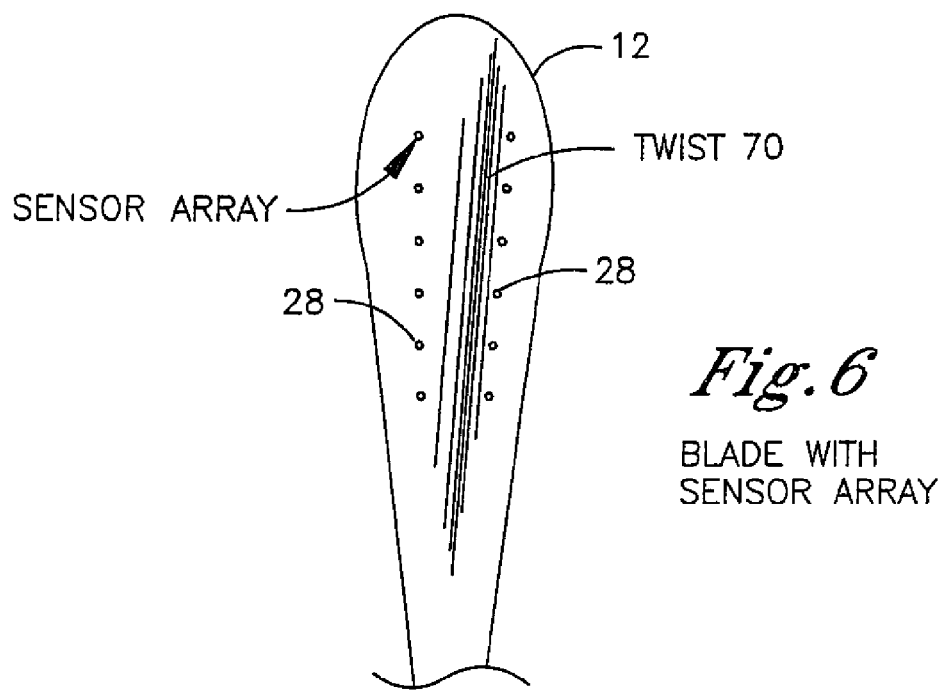
FIG. 6 is a plan view of a blade, showing one preferred non-limiting pressure sensor disposition on the blade.

FIG. 6 shows that the pressure sensors 28 can be arranged in two lines along the length of the blade 12, with one line of sensors being disposed on a first side of the "twist" 70, or blade surface aspect change line, and with a second line of sensors being disposed on the opposite side of the twist as shown.

Figure 7:
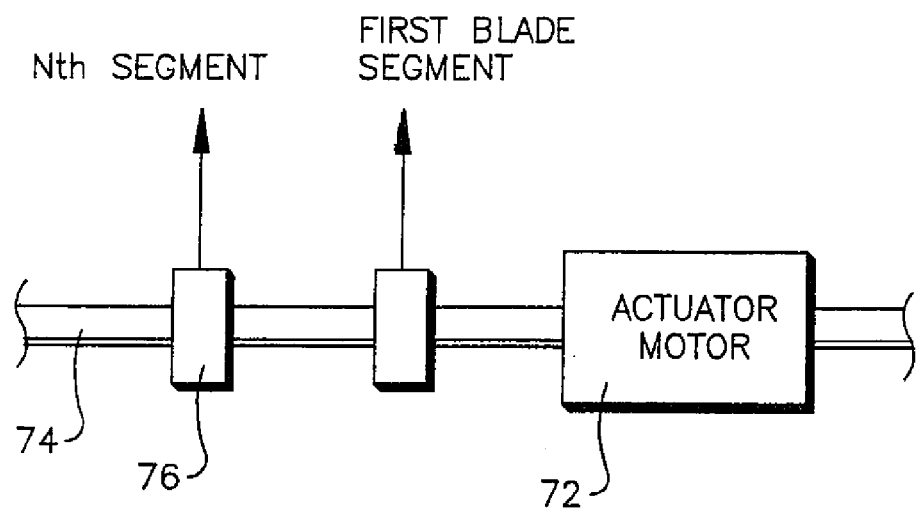
FIG. 7 is a block diagram of one actuator embodiment, in which a single motor moves plural blade segments.

FIG. 7 shows that in some implementations, a single motor 72 can be provided in the blade 12 to turn a lead screw 74 or equivalent structure, with plural nuts 76 or equivalent linking structure riding on the lead screw 74 and connected to respective blade portions to move the blade portions.

Figure 8:
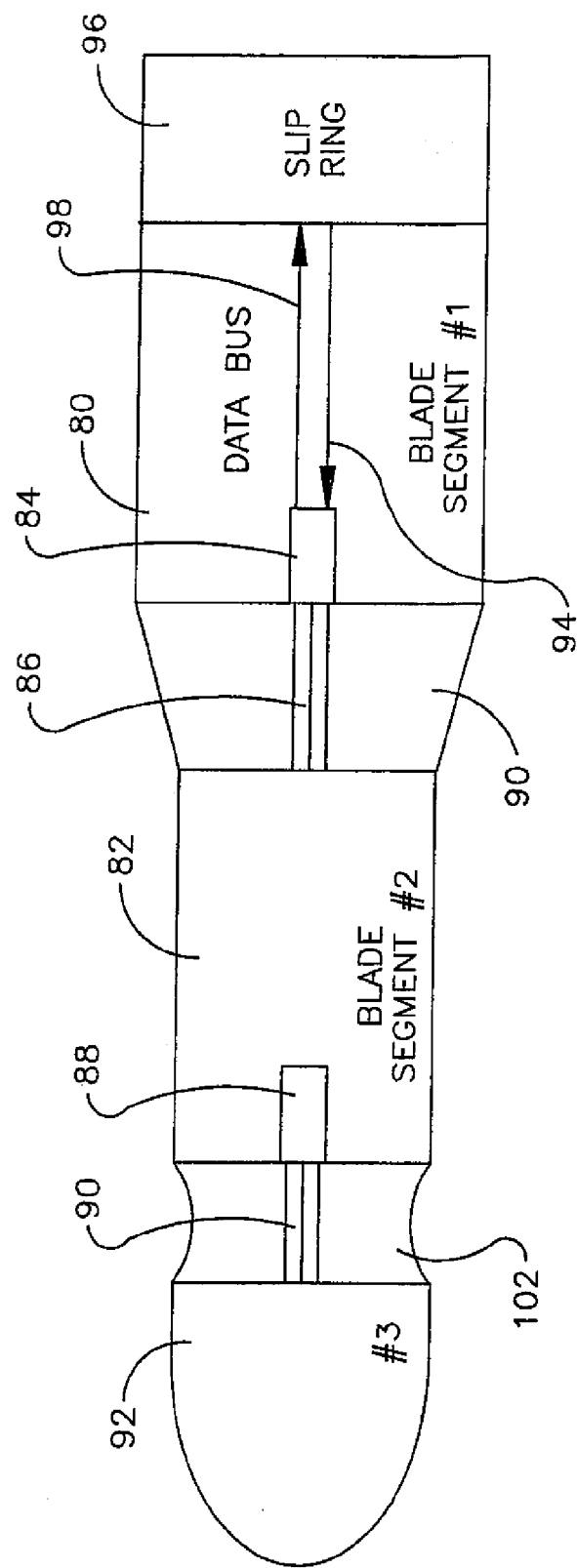
FIG. 8 is a block diagram of one actuator embodiment, in which respective motors move respective blade segments.

In contrast, FIG. 8 shows that each of plural movable blade portions 80, 82 can house its own respective motor and linkage that connects the blade portion to the distally successive blade portion. Thus, the blade portion 80 has a motor 84 with linkage 86 that extends between the blade portions 80, 82 to move the medial blade portion 82 outward from the proximal blade portion 80. Likewise, the medial blade portion 82 supports a motor 88 with associated linkage 90 extending to a distal blade portion 92, to move the distal blade portion 92 outward from the medial blade portion 82. Additional blade portions with motors and linkages may be provided. As mentioned earlier, power can be supplied to the motors through a power line 94 and slip ring assembly 96, and data and control signals can be exchanged through the slip ring assembly 96 and data bus 98 within the blade 12.

As also shown in FIG. 8, instead of using a flexible membrane 68 (FIG. 5) between adjacent blade portions, each adjacent blade portion can, in the short configuration, be partially nested within the immediately proximal portion. Accordingly, in the short configuration the sub-portion 100 (with parts broken away in FIG. 8 to expose the linkage 86) of the medial blade portion 82 is nested within the proximal blade portion 80, whereas in the long configuration shown the sub-portion 100 is telescoped distally beyond the proximal portion 80. All portions of the blade in this embodiment can be substantially rigid. Similarly, a sub-portion 102 (part of which is removed in FIG. 8 to expose the linkage 90) of the distal blade portion 92 is nested within the medial portion 82 in the short configuration and is telescoped distally beyond the medial portion 82 in the long configuration.

Figure 9:
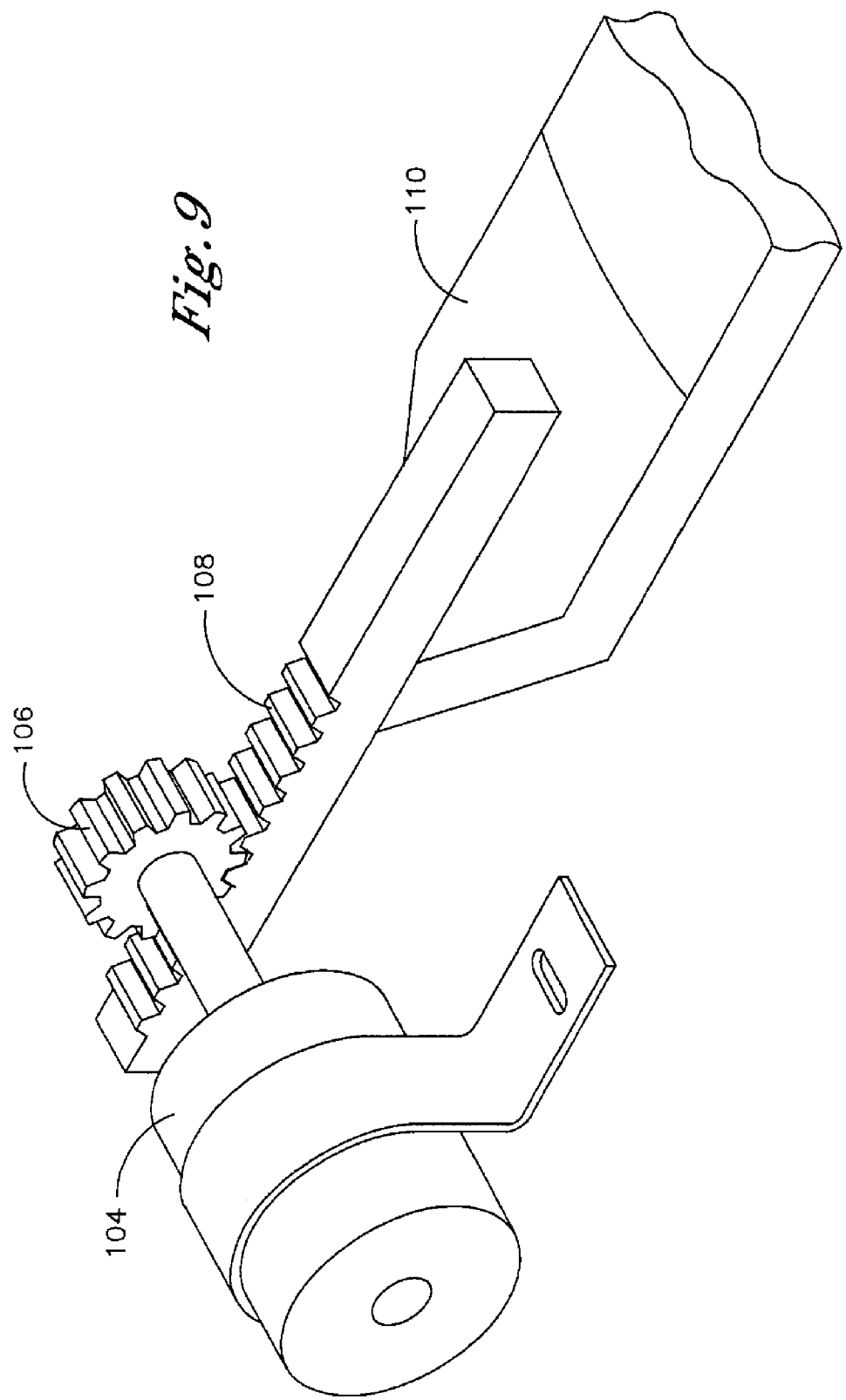
FIG. 9 is a perspective view of a non-limiting actuator.

FIG. 9 shows an illustrative non-limiting example of one of the motor actuators shown in FIG. 8. A motor 104 such as DC motor is affixed to one blade portion (not shown) to turn a pinion gear 106, which translates rotational motion to longitudinal (with respect to the blade) translational movement of a rack 108. The rack 108 is affixed to the successive blade portion 110, to move it toward and away the blade portion that supports the motor 104.

Figure 10:
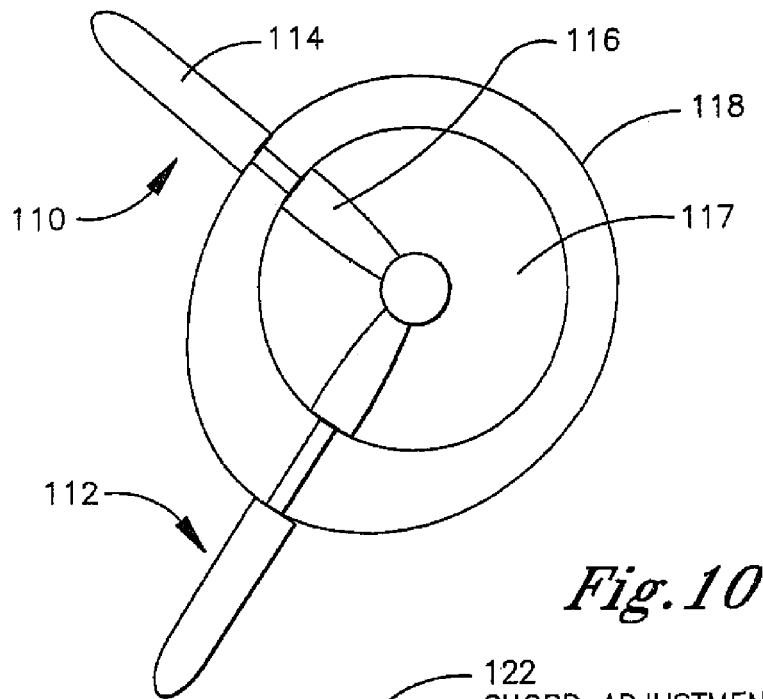
FIG. 10 is an elevational view of an alternative cam-based system.

When the length of the blade is sought to be changed only based on angular position, FIG. 10 shows that instead of using motor actuators, each blade 110, 112 of a wind turbine or propeller can have proximal and distal portions 114, 116 that telescope relative to each other as the blade, which is attached to a rotor 117, rotates past a cam 118 on which a part of the blade between the portions 114, 116 ride. The contour of the surface of the cam is established to establish the desired length-to-angular position relationship. Other mechanisms, including gearing, can be employed.

Other mechanisms for moving a blade are disclosed in U.S. Pat. No. 6,972,498, modified as appropriate to permit the individual establishment of the length of each blade, independently of other blades, as described above.

Figure 11:
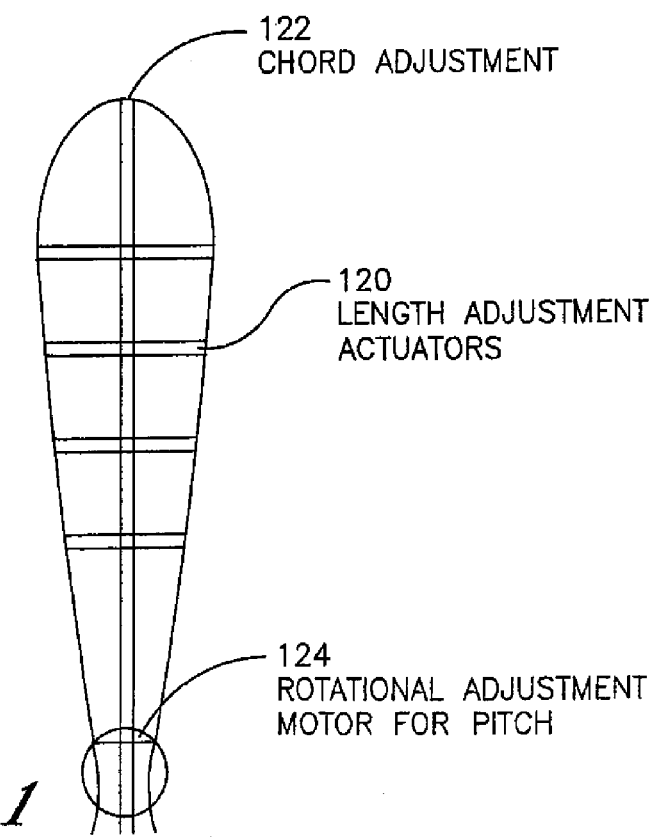
FIG. 11 is a plan view showing that the present principles, in addition to being applied to change the length of a blade, may also be applied in changing the chord and/or pitch of the blade.

FIG. 11 schematically illustrates that individual blade configuration may be independently established not just in the length dimension by length adjustment actuators 120 but alternatively or additionally in the chord dimension by chord adjustment actuators 122 and/or in the pitch dimension by a pitch adjustment actuator 124, which rotates the blade about its hub using, as non-limiting examples, the mechanisms described in U.S. Pat. No. 5,733,156. In any case, it is to be appreciated that the length and/or chord and/or pitch of each blade of the present wind turbine or propeller can be established independently of the length and/or chord and/or pitch of one or more other blades as necessary to equalize fluid pressure on the blades, to optimize performance by, e.g., attaining an optimum speed of rotation, and in the case of propellers to lower the rudder profile as necessary to avoid cavitation or even to assist in turning the vessel.

While the particular ROTATABLE BLADE APPARATUS WITH INDIVIDUALLY ADJUSTABLE BLADES is herein shown and described in detail, it is to be understood that the subject matter which is encompassed by the present invention is limited only by the claims. For instance, the principles described herein could be applied to airplane propellers and to helicopter rotor blades.

What is claimed is:

1. A wind turbine blade assembly comprising:
at least first and second blades coupled to a rotor defining an axis of rotation, the first blade defining a first pitch at a first time, the second blade defining a second pitch at the first time, the first and second pitches not being equal and at least one of the pitches being established by a pressure signal from at least one pressure sensor.

2. The assembly of claim 1, wherein the pitches are based on respective positions of the blades.

3. The assembly of claim 1, comprising an actuator coupled to at least one blade to establish the pitch of the blade.

4. The assembly of claim 1, wherein the at least one pressure sensor is disposed on at least one blade to provide the pressure signal.

5. The assembly of claim 1, wherein the pitches of the blades are established at least in part in response to at least one pressure sensor.

6. The assembly of claim 1, wherein the blades define respective chords and the chords are adjusted as the blades turn.

7. A wind turbine blade assembly comprising:
at least first and second blades coupled to a rotor, the first blade defining a first pitch at a first time, the second blade defining a second pitch at the first time, the first and second pitches not being equal and at least one pitch being established by a pressure signal from at least one pressure sensor.

8. The assembly of claim 7, wherein the pitches are established at least in part in response to at least one signal from at least one sensor disposed on at least one airfoil surface of at least one of the blades.

9. The assembly of claim 7, wherein the blades define respective chords and the chords are adjusted.

10. A turbine blade assembly comprising:
at least first and second blades coupled to a rotor defining an axis of rotation, the first blade defining a first pitch at a first time, the second blade defining a second pitch at the first time, the first and second pitches not being equal, wherein the pitches are established based on respective pressure signals from at least one pressure sensor on at least one of the blades.

11. The assembly of claim 10, comprising an actuator coupled to at least one blade to establish the pitch of the at least one blade.

12. A propeller blade assembly comprising:
at least first and second blades coupled to a rotor defining an axis of rotation, the first blade defining a first pitch at a first time, the second blade defining a second pitch at the first time, the first and second pitches not being equal, the assembly being configured for being engaged with a waterborne vessel shaft for holding the blades in a vertical plane, at least one of the pitches being established according to at least one pressure signal from at least one pressure sensor.

13. The assembly of claim 12, comprising an actuator coupled to at least one blade to establish the pitch of the blade.

14. The assembly of claim 12, wherein the blades move as they ride against a cam surface.

15. The assembly of claim 12, wherein the blades define respective chords and the chords are adjusted.

16. A propeller blade assembly comprising:
at least first and second blades coupled to a rotor defining an axis of rotation, the first blade defining a first pitch at a first time, the second blade defining a second pitch at the first time, the first and second pitches not being equal, wherein the pitches are established based on respective pressure signals from at least one of the blades.

17. The assembly of claim 16, wherein the pitches are based on respective angular positions of the blades with respect to the rotor.

18. The assembly of claim 16, wherein the blades define respective chords and the chords are adjusted.

* * * * *